United States Patent
Nakazawa

(10) Patent No.: US 9,487,871 B2
(45) Date of Patent: Nov. 8, 2016

(54) HIGH-PRESSURE WATER ELECTOLYSIS APPARATUS

(71) Applicant: HONDA MOTOR CO., LTD., Tokyo (JP)

(72) Inventor: Koji Nakazawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 338 days.

(21) Appl. No.: 14/078,534

(22) Filed: Nov. 13, 2013

(65) Prior Publication Data

US 2014/0151217 A1    Jun. 5, 2014

(30) Foreign Application Priority Data

Nov. 26, 2012   (JP) .................................. 2012-257200

(51) Int. Cl.
   *C25B 9/08* (2006.01)
   *C25B 1/12* (2006.01)

(52) U.S. Cl.
   CPC . *C25B 9/08* (2013.01); *C25B 1/12* (2013.01); *Y02E 60/366* (2013.01)

(58) Field of Classification Search
   CPC .... C25B 1/02–1/12; C25B 9/08; C25B 9/10; H01M 8/0278; Y02E 60/366
   See application file for complete search history.

(56) References Cited

U.S. PATENT DOCUMENTS

| | | | |
|---|---|---|---|
| 2008/0233447 A1* | 9/2008 | Gemba | H01M 8/0258 429/433 |
| 2010/0136456 A1* | 6/2010 | Sugawara | H01M 8/0276 429/479 |
| 2010/0206722 A1* | 8/2010 | Haryu | C25B 13/00 204/252 |
| 2012/0073962 A1* | 3/2012 | Haryu | C25B 1/12 204/263 |

FOREIGN PATENT DOCUMENTS

JP   2011-208163   10/2011

* cited by examiner

*Primary Examiner* — Ciel Thomas
(74) *Attorney, Agent, or Firm* — Mori & Ward, LLP

(57) ABSTRACT

A high-pressure water electrolysis apparatus includes a solid polymer electrolyte membrane, an anode side separator, a cathode side separator, an anode side element member, a cathode side element member, a high-pressure hydrogen communication hole, a first seal member, and a second seal member. The first seal member is provided between the solid polymer electrolyte membrane and an outer circumference edge portion of the anode side separator. The second seal member has a thickness same as a thickness of the anode side element member at a time of operation of the high-pressure water electrolysis apparatus. The second seal member is disposed in an anode chamber to shield between the anode chamber and the high-pressure hydrogen communication hole.

7 Claims, 7 Drawing Sheets

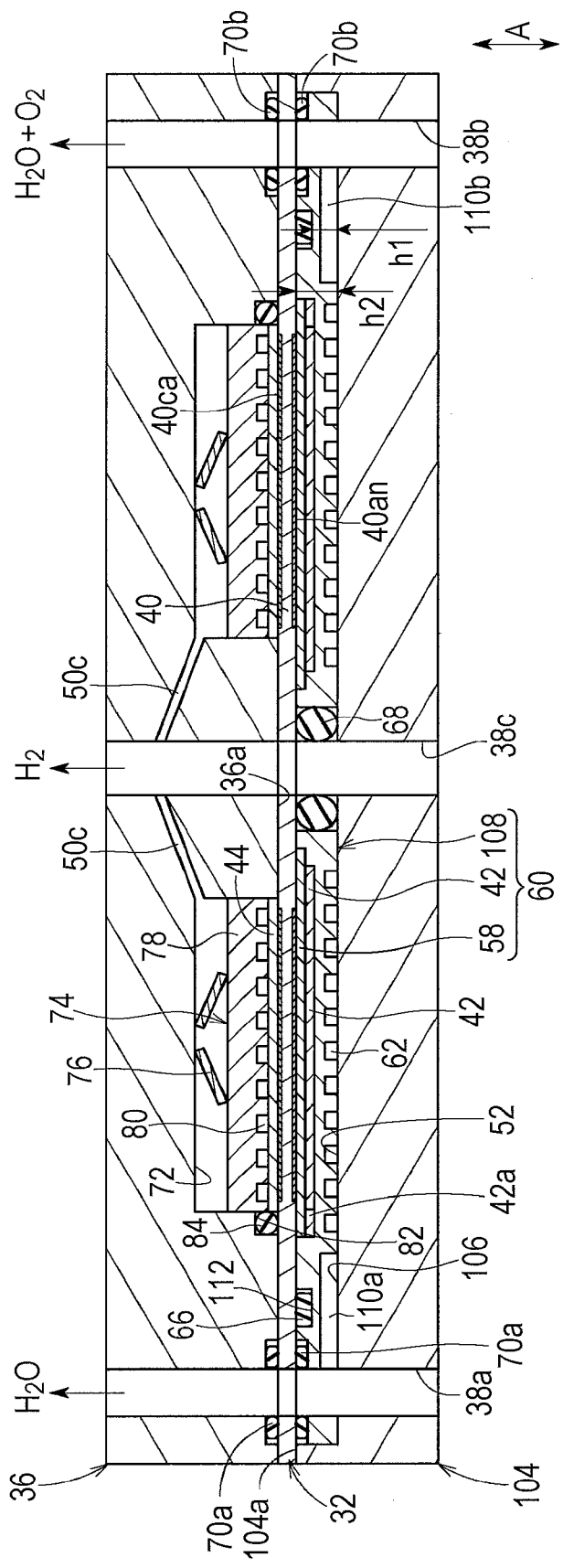

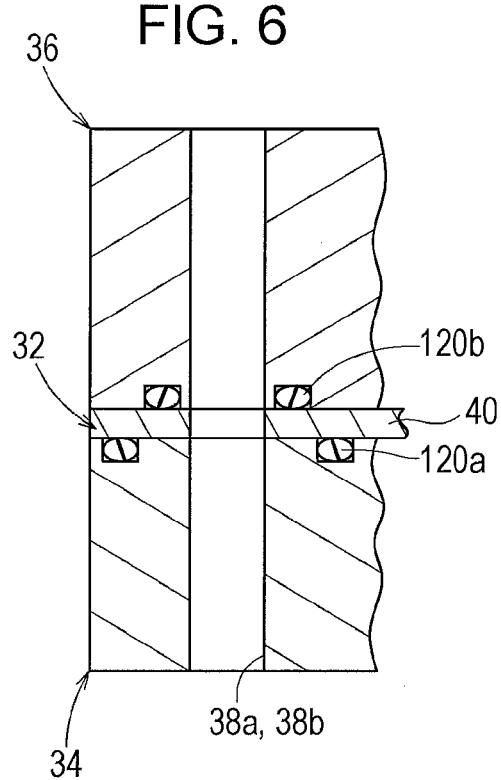
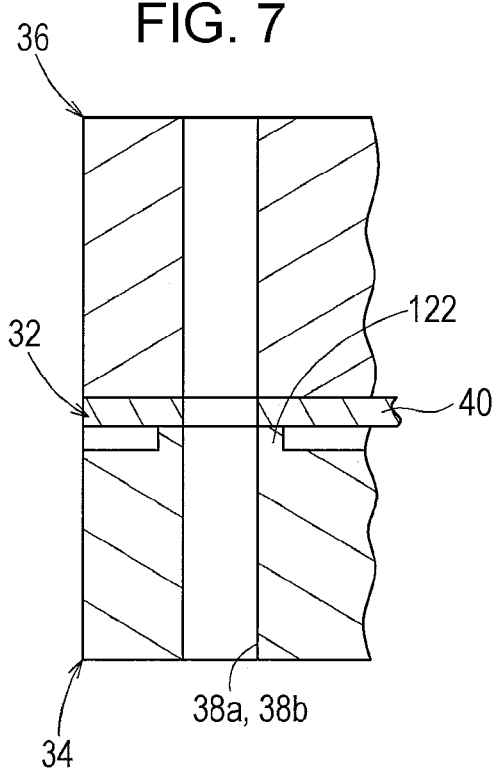

HIGH-PRESSURE WATER ELECTROLYSIS APPARATUS

CROSS-REFERENCE TO RELATED APPLICATIONS

The present application claims priority under 35 U.S.C. §119 to Japanese Patent Application No. 2012-257200, filed Nov. 26, 2012, entitled "High-Pressure Water electrolysis apparatus." The contents of this application are incorporated herein by reference in their entirety.

BACKGROUND

1. Field

The present disclosure relates to a high-pressure water electrolysis apparatus.

2. Description of the Related Art

For example, hydrogen gas is employed as fuel gas for generating electric power in a fuel cell. In general, at the time of generating hydrogen gas, a water electrolysis apparatus is employed. This water electrolysis apparatus employs a solid polymer electrolyte membrane to electrically decompose water to generate hydrogen (and oxygen). With both faces of the solid polymer electrolyte membrane, an electrode catalyst layer is provided to make up an electrolyte membrane/electrode structure, and also, with both sides of the electrolyte membrane/electrode structure, a current collector is provided to make up a unit cell.

A plurality of such unit cells are stacked into a cell unit, and a voltage is applied across the cell unit while water is supplied to the current collectors on the anode side. On the anodes of the membrane electrode assembly, the water is decomposed to produce hydrogen ions (protons). The hydrogen ions permeate through the solid polymer electrolyte membranes to the cathodes, where the hydrogen ions combine with electrons to generate hydrogen. On the anodes, oxygen generated together with hydrogen is discharged with excess water from the cell units.

As technology of this kind, for example, a water electrolysis apparatus disclosed in Japanese Unexamined Patent Application Publication No. 2011-208163 has been known. With this water electrolysis apparatus, an anode side separator which makes up an anode chamber is disposed on one face side of a solid polymer electrolyte membrane, and a cathode side separator which makes up a cathode chamber is disposed on the other face side of the solid polymer electrolyte membrane.

With the anode chamber, an anode current collector and an anode side element member including a water channel member configured to distribute electrolytic water to the anode current collector are housed. On the other hand, with the cathode chamber, a cathode current collector and a cathode side element member including a pressing member configured to press the cathode current collector against the solid polymer electrolyte membrane are housed.

Further, a groove portion is formed in a manner surrounding the outer side of the anode chamber on a face facing the solid polymer electrolyte membrane of the anode side separator, and a seal member is disposed in the groove portion. A groove portion is formed in a manner surrounding the outer side of the cathode chamber on a face facing the solid polymer electrolyte membrane of the cathode side separator, and a seal member is disposed in the groove portion.

SUMMARY

According to one aspect of the present invention, a high-pressure water electrolysis apparatus includes a solid polymer electrolyte membrane, an anode side separator, a cathode side separator, an anode side element member, a cathode side element member, a high-pressure hydrogen communication hole, a first seal member, and a second seal member. The anode side separator is disposed on a first face side of the solid polymer electrolyte membrane and includes an outer circumference edge portion facing the solid polymer electrolyte membrane to define an anode chamber opened to the first face side. The cathode side separator is disposed on a second face side of the solid polymer electrolyte membrane and includes a cathode chamber opened to the second face side. The anode side element member includes an anode current collector and a water channel member. The water channel member is to distribute electrolytic water to the anode current collector. The water channel member is disposed in the anode chamber and includes an outer circumference edge portion facing the solid polymer electrolyte membrane. The cathode side element member is disposed in the cathode chamber and includes a cathode current collector and a pressing member. The pressing member is to press the cathode current collector against the solid polymer electrolyte membrane side. The high-pressure hydrogen communication hole extends through the anode current collector, the solid polymer electrolyte membrane, and the cathode current collector. The high-pressure hydrogen generated from the electrolytic water by electrolyzation is to be discharged through the high-pressure hydrogen communication hole. The first seal member is provided between the solid polymer electrolyte membrane and the outer circumference edge portion of the anode side separator. One of the outer circumference edge portion of the anode side separator and the outer circumference edge portion of the water channel member has a smaller dimension at depth from a bottom of the anode chamber than a thickness of the anode side element member. The second seal member has a thickness same as the thickness of the anode side element member at a time of operation of the high-pressure water electrolysis apparatus. The second seal member is disposed in the anode chamber to shield between the anode chamber and the high-pressure hydrogen communication hole.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 5 is a cross-sectional explanatory diagram of unit cells making up a high-pressure water electrolysis apparatus according a second embodiment of the present disclosure.

FIG. 6 is an explanatory diagram of another seal configuration.

FIG. 7 is an explanatory diagram of yet another seal configuration.

DESCRIPTION OF THE EMBODIMENTS

Figure 1:
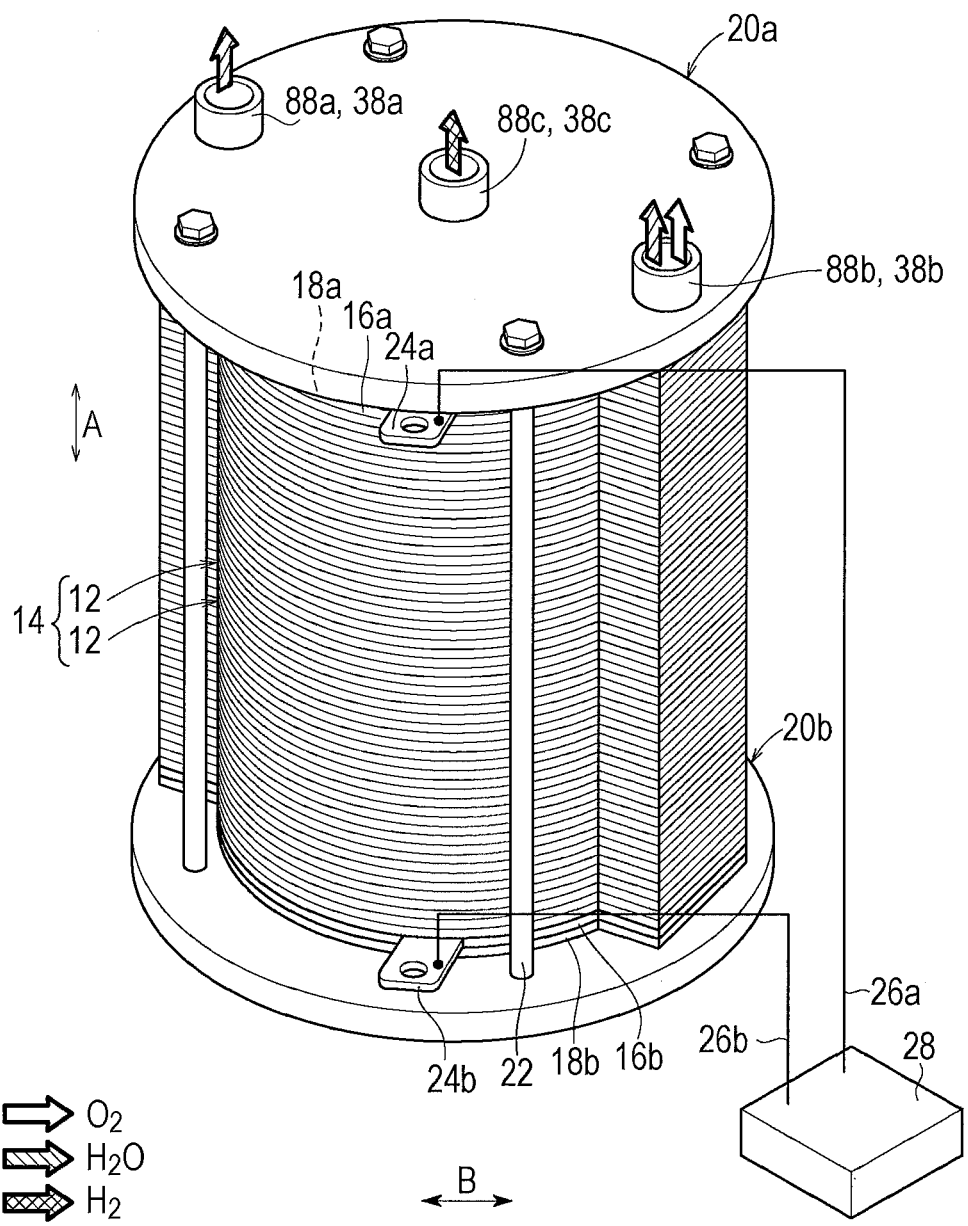
FIG. 1 is a perspective explanatory diagram of a high-pressure water electrolysis apparatus according to a first embodiment of the present disclosure.

The embodiments will now be described with reference to the accompanying drawings, wherein like reference numerals designate corresponding or identical elements throughout the various drawings.

As illustrated in FIG. 1, a high-pressure water electrolysis apparatus (differential pressure type water electrolysis apparatus) 10 according to a first embodiment of the present disclosure includes a stacked body 14 where multiple unit cells 12 are laminated in the vertical direction (arrow A direction) or horizontal direction (arrow B direction).

With one edge (upper edge) in the stacking direction of the stacked body 14, a terminal plate 16a, an insulating plate 18a, and an end plate 20a are sequentially provided upward. With the other edge (lower edge) in the stacking direction of the stacked body 14, similarly, a terminal plate 16b, an insulating plate 18b, and an end plate 20b are sequentially provided downward.

The high-pressure water electrolysis apparatus 10 integrally fastens and holds between the disc-shaped end plates 20a and 20b via four tie rods 22 extending in the arrow A direction. Now, an arrangement may be made wherein the high-pressure water electrolysis apparatus 10 is integrally held by a box-shaped casing (not illustrated) including the end plates 20a and 20b as edge plates. Also, the high-pressure water electrolysis apparatus 10 has a generally cylindrical shape as a whole, but may be set to various shapes such as a cube-shape and so forth.

Terminal portions 24a and 24b are provided to the side portions of the terminal plates 16a and 16b in a manner protruding outward, respectively. The terminal portions 24a and 24b are electrically connected to an electrolytic power source 28 via wirings 26a and 26b, respectively.

Figure 2:
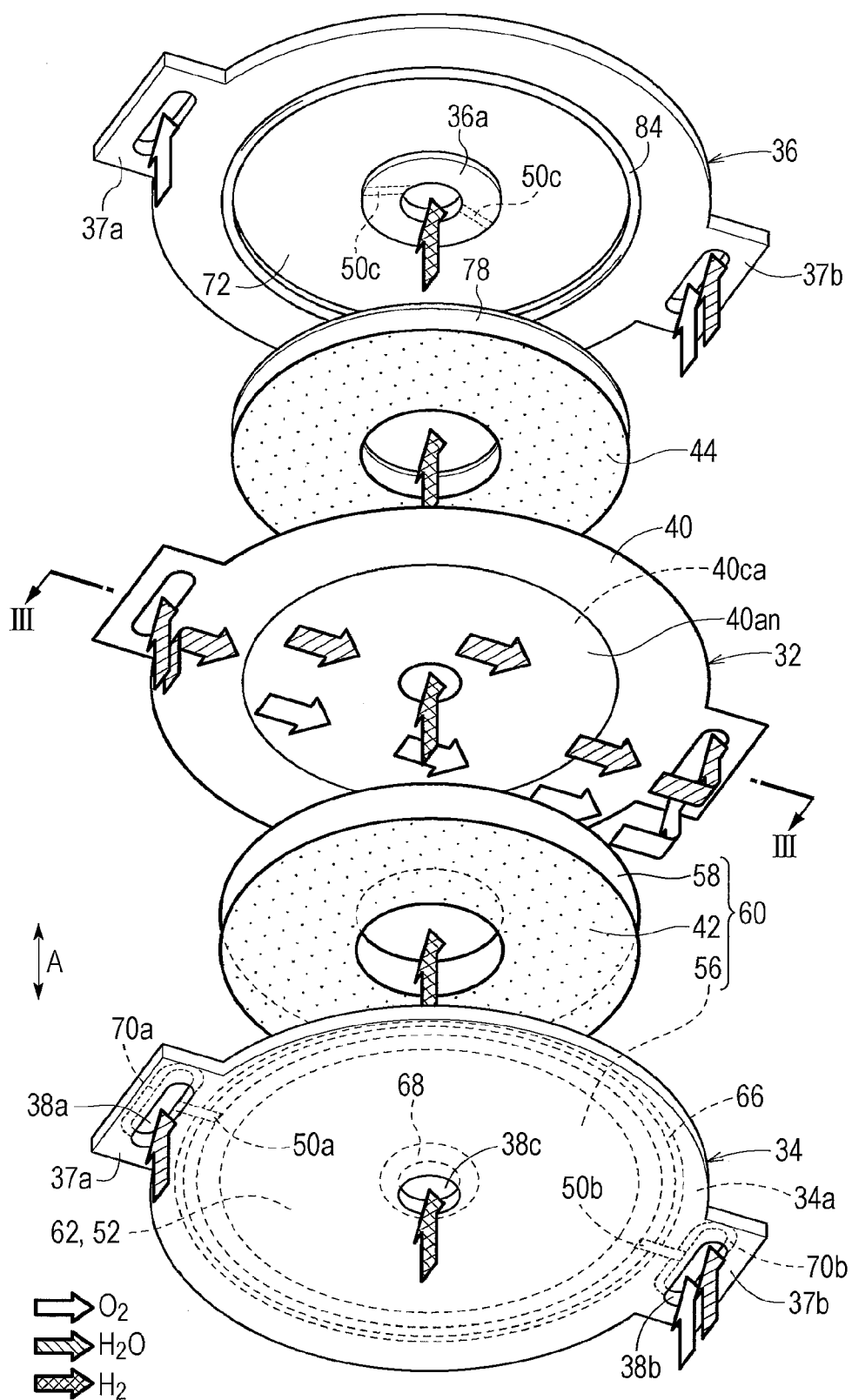
FIG. 2 is an exploded perspective explanatory diagram of a unit cell making up the high-pressure water electrolysis apparatus.
Figure 3:
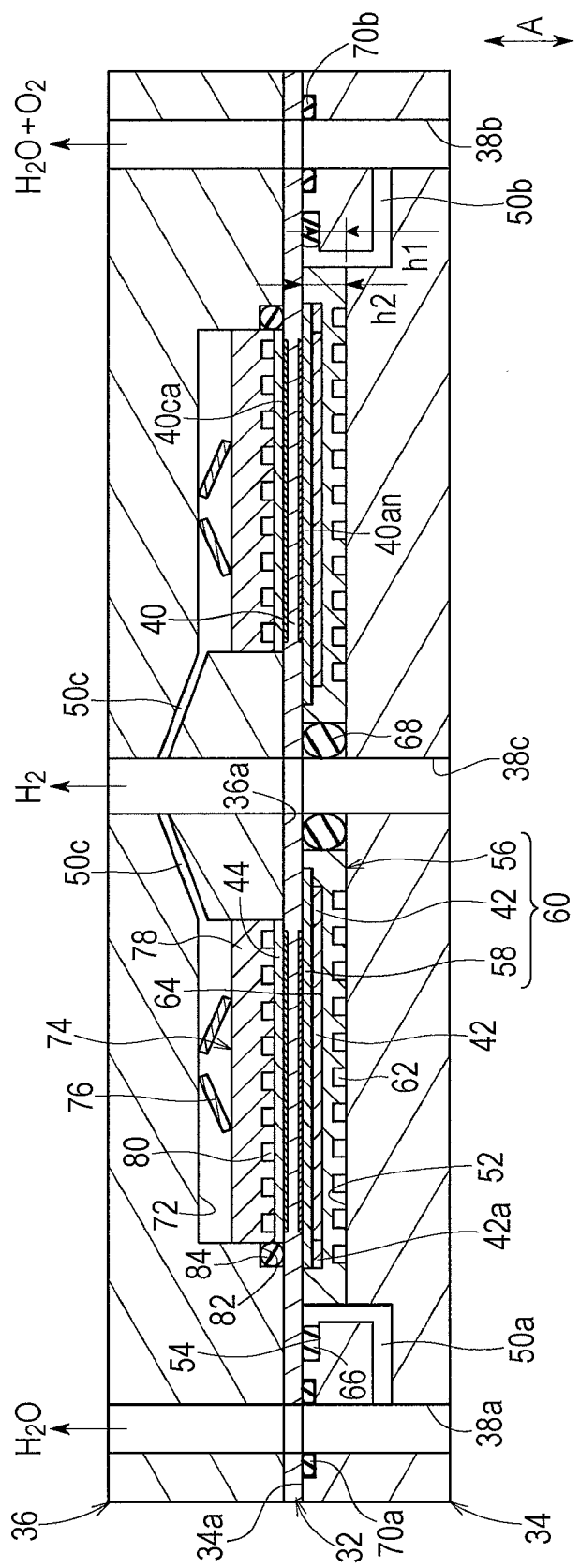
FIG. 3 is a cross-sectional view taken along line III-III in FIG. 2 of the unit cell.

As illustrated in FIGS. 2 and 3, the unit cells 12 include generally disc-shaped electrolyte membrane/electrode structure 32, an anode side separator 34 and a cathode side separator 36 which sandwich the electrolyte membrane/electrode structure 32.

As illustrated FIG. 2, with outer circumferential edge portions of the unit cells 12, there are formed a first protruding portion 37a and a second protruding portion 37b which mutually protrude in an opposite direction outward in a separator face direction. Provided to the first protruding portion 37a is a water supply communication hole 38a mutually communicating in the stacking direction (arrow A direction), and configured to supply water (pure water). Provided to the second protruding portion 37b is a water discharge communication hole 38b mutually communicating in the stacking direction and configured to discharge oxygen generated by reaction and unreacted water (mixed fluid).

Provided to the central portions of the unit cells 12 are a high-pressure hydrogen communication hole 38c mutually communicating in the stacking direction and passing through generally the center of an electrolytic region, and configured to discharge high-pressure hydrogen generated by reaction (see FIGS. 2 and 3).

The anode side separator 34 and cathode side separator 36 have a general disc shape, and are configured of a carbon member or the like, or configured by subjecting a sheet steel, stainless sheet steel, titanium plate, aluminum plate, plated sheet steel, or metal plate of which the metal surface has been subjected to corrosion-proof surface processing, to press molding, or surface processing for corrosion prevention after cutting work.

The electrolyte membrane/electrode structure 32 includes a solid polymer electrolyte membrane 40 having a ring shape, and an anode current collector 42 and a cathode current collector 44 for electrolysis which have a ring shape and sandwich the solid polymer electrolyte membrane 40.

The solid polymer electrolyte membrane 40 has the high-pressure hydrogen communication hole 38c formed at the generally middle portion thereof, and also an anode electrode catalyst layer 40an and a cathode electrode catalyst layer 40ca which have a ring shape are formed on both faces of the solid polymer electrolyte membrane 40. For example, a ruthenium-based catalyst is employed as the anode electrode catalyst layer 40an, and on the other hand, for example, a platinum catalyst is employed as the cathode electrode catalyst layer 40ca.

The anode current collector 42 and cathode current collector 44 are configured of a sintered compact (porous electric conductor) of spherical atomizing titanium powder, for example. With the anode current collector 42 and cathode current collector 44, a smooth surface portion to be subjected to etching after cutting work is provided, and also, porosity is set within a range of 10% to 50%, and preferably within a range of 20% to 40%.

Figure 4:
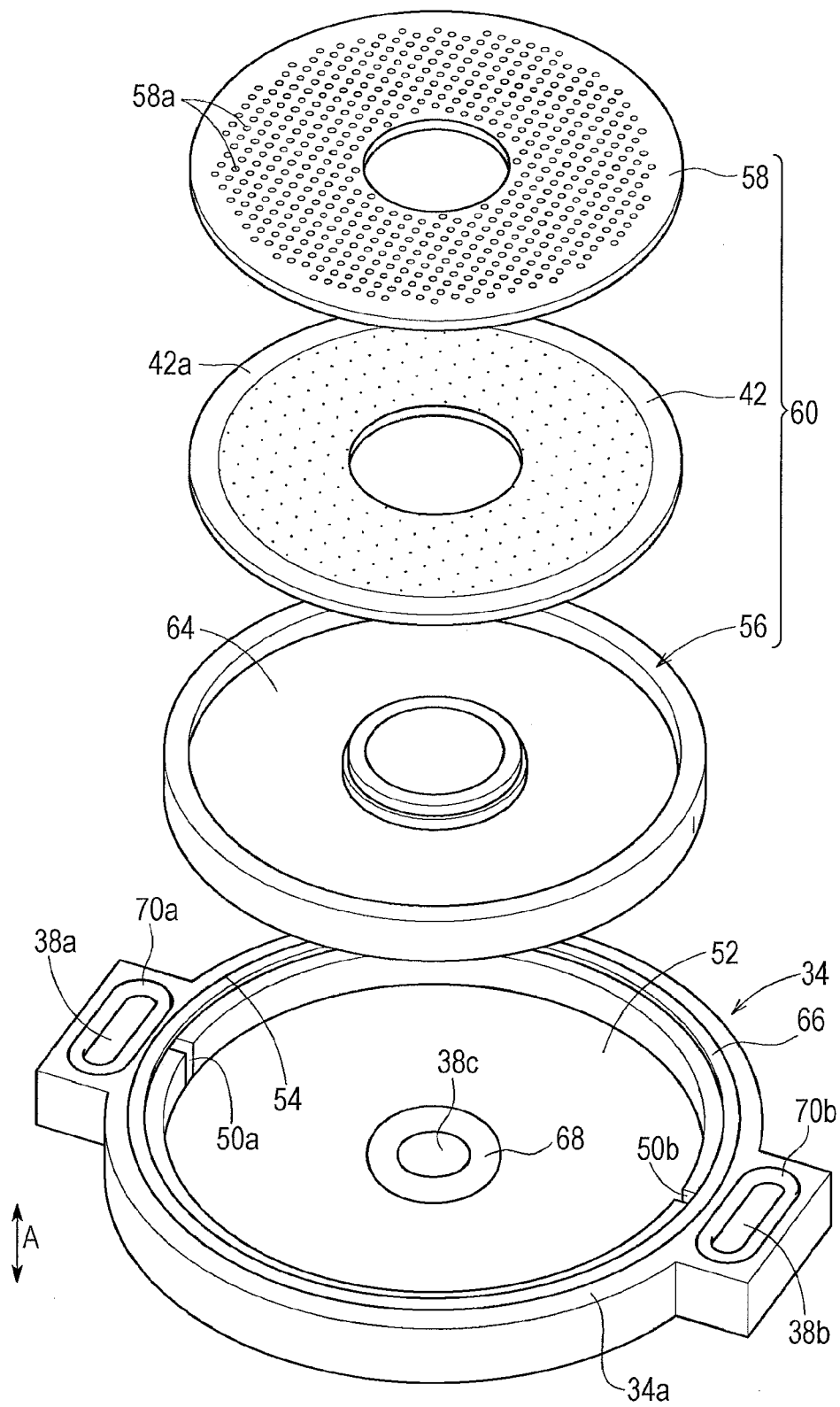
FIG. 4 is an exploded perspective explanatory diagram of an anode side element member and an anode side separator which make up the unit cell.

As illustrated in FIGS. 2 and 3, provided to the anode side separator 34 are a supply passage 50a communicating with the water supply communication hole 38a, and a discharge passage 50b communicating with the water discharge communication hole 38b. With a face 34a toward the electrolyte membrane/electrode structure 32 of the anode side separator 34, as illustrated in FIGS. 3 and 4, a ring-shaped recessed portion is formed, whereby an anode chamber 52 is formed. The anode chamber 52 communicates with the supply passage 50a and discharge passage 50b.

With the face 34a of the anode side separator 34, a circumferential groove 54 is formed in a manner circling around outward of the anode chamber 52, and is recessed to predetermined depth. With the anode chamber 52, there is disposed an anode side element member 60 including the anode current collector 42, a water channel member (support plate) 56 configured to distribute water for electrolysis to the anode current collector 42, and a ring-shaped protective sheet 58 to be introduced between the anode current collector 42 and solid polymer electrolyte membrane 40 as appropriate.

The water channel member 56 is configured of, for example, a porous electric conductor, or formed of multiple hole portions or opening portions, and a water channel 62 communicating with the supply passage 50a and discharge passage 50b is provided (see FIG. 3).

With a face on the solid polymer electrolyte membrane 40 of the water channel member 56, a recessed portion 64 in which the anode current collector 42 and protective sheet 58 are housed is provided. The protective sheet 58 includes multiple hole portions 58a. Note that the protective sheet 58 is not restricted to the hole portions 58a as long as opening portions are provided.

The diameter of the protective sheet 58 is set to the same diameter as the diameter of the anode current collector 42. At the time of the inner circumferential diameter of the protective sheet 58 being set to a smaller diameter than the inner circumferential diameter of the anode current collector 42, a stepped portion is configured on the inner circumferential side of the recessed portion 64 of the water channel member 56. Note that the inner circumferential diameter of the protective sheet 58 may be set to the same dimension as with the inner circumferential diameter of the anode current collector 42.

The anode side element member 60 makes up a planar-shaped member as a whole. With the circumferential groove 54 of the anode side separator 34, a flat packing 66 is disposed between the outer circumferential edge portion and the solid polymer electrolyte membrane 40 as a first seal member. The flat packing 66 has a ring shape. With the outer circumferential edge portion of the anode side separator 34, the circumferential groove 54 is formed, whereby depth h1 from the bottom of the anode chamber 52 is set to a smaller dimension than thickness h2 of the anode side element member 60 (see FIG. 3).

With the anode chamber 52, for example, an O-ring 68 is disposed as a second seal member positioned in the central portion of the anode side element member 60 and configured to shield between the anode chamber 52 and high-pressure hydrogen communication hole 38c. The O-ring 68 has the same thickness as the thickness of the anode side element member 60 at the time of running the high-pressure water electrolysis apparatus 10. The O-ring 68 is in contact with a single member making up the anode side element member 60, for example, the inner circumferential face of the water channel member 56.

Provided to the outer circumference of the anode current collector 42 is a frame portion 42a. The frame portion 42a may be integrally provided by finely configuring the outer circumferential portion of the anode current collector 42.

With the face 34a of the anode side separator 34, seal configurations, for example, flat gaskets 70a and 70b are disposed, respectively, circling the water supply communication hole 38a and water discharge communication hole 38b.

A face 36a toward the solid polymer electrolyte membrane 40 of the cathode side separator 36 has a cathode chamber 72 is formed in a manner recessed in a generally ring shape. The cathode chamber 72 is set deeper than the anode chamber 52, and with this cathode chamber 72, there are disposed at least the cathode current collector 44 and a load applying mechanism 74 configured to press the cathode current collector 44 against the solid polymer electrolyte membrane 40 which are cathode side element members.

The load applying mechanism 74 includes a disc spring 76, and also applies load to the cathode current collector 44 via a disc spring holder 78. With the disc spring holder 78, a high-pressure hydrogen channel 80 is formed on a face facing the cathode current collector 44. The high-pressure hydrogen channel 80 communicates with the high-pressure hydrogen communication hole 38c from the cathode chamber 72 via a hydrogen discharge passage 50c.

A ring-shaped groove portion 82 communicates with the cathode chamber by circling the outer circumferential edge portion of this cathode chamber 72. With the groove portion 82, an O-ring 84 is disposed, and the O-ring 84 presses the solid polymer electrolyte membrane 40 against the outer circumferential edge portion of the water channel member 56.

As for the flat packing 66, O-rings 68 and 84, and flat gaskets 70a and 70b, there is employed a seal member having elasticity such as a seal material, a cushion material, a packing material, or the like, formed of EPDM, NBR, fluorine-containing rubber, silicon rubber, phlorosilicon rubber, butyl rubber, natural rubber, styrene rubber, chloroprene, acrylic rubber, or the like.

As illustrated in FIG. 1, connected to the end plate 20a are pipes 88a, 88b, and 88c communicating with the water supply communication hole 38a, water discharge communication hole 38b, and high-pressure hydrogen communication hole 38c. With the pipe 88c, though not illustrated, a back pressure valve (or solenoid valve) is provided, and accordingly, the pressure of hydrogen generated at the high-pressure hydrogen communication hole 38c may be maintained in high pressure.

Operation of the high-pressure water electrolysis apparatus 10 thus configured will be described next.

As illustrated in FIG. 1, water is supplied from the pipe 88a to the water supply communication hole 38a of the high-pressure water electrolysis apparatus 10, and also, voltage is applied to the terminal portions 24a and 24b of the terminal plates 16a and 16b via the electrolytic power source 28 electrically connected thereto. Accordingly, as illustrated in FIGS. 2 and 3, at each of the unit cells 12, water is supplied to the water channel 62 of the anode side separator 34 from the water supply communication hole 38a, and this water is moved along within the anode current collector 42.

Accordingly, the water is electrically decomposed at the anode electrode catalyst layer 40an, and hydrogen ions, electrons, and oxygen are generated. The hydrogen ions generated by this anodic reaction transmit the solid polymer electrolyte membrane 40, move to the cathode electrode catalyst layer 40ca side, and are connected with electrons, and hydrogen is obtained.

Therefore, hydrogen flows along a hydrogen channel within the cathode current collector 44, and the hydrogen flows into the high-pressure hydrogen communication hole 38c in a state maintained in high-pressure than the water supply communication hole 38a, and becomes extractable out of the high-pressure water electrolysis apparatus 10. On the other hand, oxygen generated by reaction and unreacted water are discharged out of the high-pressure water electrolysis apparatus 10 along the water discharge communication hole 38b.

In this case, with the first embodiment, at the anode side separator 34, the anode chamber 52 is formed communicating with the high-pressure hydrogen communication hole 38c, and also depth h1 of the outer circumferential edge portion which forms this anode chamber 52 is set to a smaller dimension than thickness h2 of the anode side element member 60.

The flat packing 66 is disposed in the outer circumferential edge portion of the anode side separator 34, and also, the O-ring 68 is disposed in the anode chamber 52 corresponding to inner space of the anode side element member 60. Accordingly, the O-ring 68 is disposed in the anode chamber 52 along with the anode side element member 60, and shields between the anode chamber 52 and the high-pressure hydrogen communication hole 38c.

In this manner, with the anode side separator 34, a recessed portion (anode chamber 52) which houses the anode side element member 60, and a groove portion for disposing the O-ring 68 are not individually provided. Moreover, the number of members which require smoothness on the anode side may be reduced. Thus, an advantage is obtained in that processing precision of the anode side separator 34 does not have to be set high, and a desired seal function may be secured with a simple and also economical configuration.

Further, with the anode side element member 60, the inner circumferential face of the water channel member 56 which is one member is in contact with the O-ring 68. Therefore, a great number of members are not in contact with the O-ring 68, and damage of the O-ring 68 may suitably be suppressed.

Further, with the anode side element member 60, the recessed portion (including stepped recessed portion) 64 is formed in the water channel member 56, and the anode current collector 42 and protective sheet 58 are housed and disposed in the recessed portion 64. Accordingly, there is a merit wherein assembling workability of the anode side element member 60 including multiple members is suitably improved.

Also, the anode side element member 60 makes up a flat plane member as a whole, and also, the O-ring 68 has the same thickness as with the anode side element member 60. Thus, processability of the anode side element member 60 is improved.

Further, the anode current collector 42 includes a frame portion 42a at the outer circumference. Therefore, in the event that the anode current collector 42 is pressed at the time of electrolysis operation, the anode current collector 42 held in the frame portion 42a may be kept from being crushed. Accordingly, smoothness of the surface of the anode side element member 60 may be maintained in a sure manner.

Further, with the cathode side separator 36, the cathode chamber 72 housing the cathode current collector 44 and load applying mechanism 74 which are cathode side element members is formed, and also, the outer circumferential side of this cathode chamber 72 communicates with the groove portion 82. Upon the O-ring 84 being disposed in the groove portion 82, a seal chamber is formed by the groove portion 82 and the outer circumferential portion of the disc spring holder 78.

Thus, the O-ring 84 may be in contact with the disc spring holder 78. Therefore, at the time of depressurization of the cathode chamber 72, the O-ring 84 may effectively be prevented from withdrawing under working of the disc spring holder 78.

FIG. 5 is a cross-sectional explanatory diagram of unit cells 102 making up a high-pressure water electrolysis apparatus 100 according to a second embodiment of the present disclosure. Note that the same components as with the high-pressure water electrolysis apparatus 10 according to the first embodiment are denoted with the same reference numerals, and detailed description thereof will be omitted.

The unit cells 102 include an anode side separator 104 and a cathode side separator 36 which sandwich the electrolyte membrane/electrode structure 32.

With a face 104a facing the solid polymer electrolyte membrane 40 of the anode side separator 104, an anode chamber 106 is formed. The anode chamber 106 is provided across the water supply communication hole 38a and water discharge communication hole 38b, and with the anode chamber 106, the anode side element member 60 is disposed.

The anode side element member 60 includes a water channel member 108, and the water channel member 108 is provided with the water supply communication hole 38a and water discharge communication hole 38b. The water channel member 108 forms a supply passage 110a which communicates between the water supply communication hole 38a and water channel 62, and a discharge passage 110b which communicates between the water discharge communication hole 38b and the water channel 62. Note that, with the face 36a of the cathode side separator 36, the flat gaskets 70a and 70b may be provided circling around the water supply communication hole 38a and water discharge communication hole 38b.

The water channel member 108 forms a groove portion 112 in the outer circumferential edge portion facing the solid polymer electrolyte membrane 40, and the flat packing 66 is disposed in this groove portion 112. With the outer circumferential edge portion of the water channel member 108, depth h1 from the bottom of the anode chamber 52 is set to a smaller dimension than thickness h2 of the anode side element member 60.

With the second embodiment thus configured, the anode side element member 60 and O-ring 68 are disposed in the anode chamber 106, and the anode chamber 106 and high-pressure hydrogen communication hole 38c are shielded by the O-ring 68. Accordingly, the same advantage as with the first embodiment is obtained.

Note that, with the first and second embodiments, the flat gaskets 70a and 70b are provided to at least one of the water supply communication hole 38a and water discharge communication hole 38b as seal configurations, but are not restricted to this. For example, as illustrated in FIG. 6, O-rings 120a and 120b may be disposed in the anode side separator 34 and cathode side separator 36 by mutually being offset in the stacking direction, respectively.

Further, as illustrated in FIG. 7, for example, a protruding portion 122 circling around the water supply communication hole 38a and water discharge communication hole 38b is provided to the anode side separator 34, whereby a film seal may be configured under close contact between this protruding portion 122 and the solid polymer electrolyte membrane 40.

Figure 8:
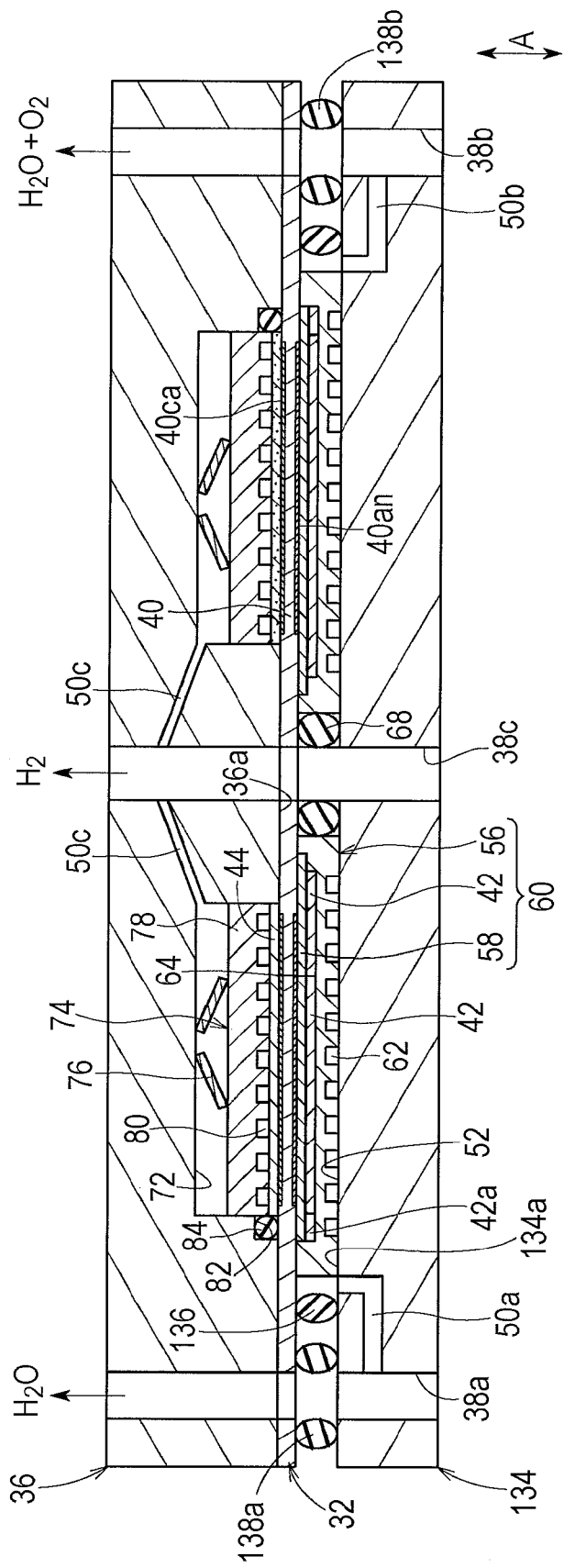
FIG. 8 is a cross-sectional explanatory diagram of unit cells making up a high-pressure water electrolysis apparatus according a third embodiment of the present disclosure.

FIG. 8 is a cross-sectional explanatory diagram of unit cells 132 making up a high-pressure water electrolysis apparatus 130 according to a third embodiment of the present disclosure. Note that the same components as with the high-pressure water electrolysis apparatus 10 according to the first embodiment are denoted with the same reference numerals, and detailed description thereof will be omitted.

The unit cells 132 includes an anode side separator 134 and a cathode side separator 36 which sandwich the electrolyte membrane/electrode structure 32.

The anode side separator 134 is a flat plane member, and a face 134a facing the solid polymer electrolyte membrane 40 is formed on a flat surface. With the face 134a, an O-ring 136 is disposed as a first seal member, whereby the anode chamber 52 is formed within the O-ring 136. The anode side element member 60 is disposed in the anode chamber 52.

With the face 134a of the anode side separator 134, seal configurations, for example, O-rings 138a and 138b are disposed, respectively, circling around the water supply communication hole 38a and water discharge communication hole 38b.

With the third embodiment thus configured, the same advantages as with the first and second embodiments are obtained. Moreover, in particular, the anode side separator 134 is configured of a flat plane member of which the face 134a facing the solid polymer electrolyte membrane 40 is a smooth face. Accordingly, an advantage is obtained wherein processability of the anode side separator 134 is suitably improved.

The high-pressure water electrolysis apparatus according to the embodiment is configured to electrically decompose water and to generate oxygen and high-pressure hydrogen than the oxygen, and includes: a solid polymer electrolyte membrane; an anode side separator disposed on one face side of the solid polymer electrolyte membrane, where an anode chamber opened to the one face side is formed; a cathode side separator disposed on the other face side of the solid polymer electrolyte membrane, where a cathode chamber opened to the other face side is formed; an anode side element member having at least an anode current collector and a water channel member configured to distribute electrolytic water to the anode current collector, which is disposed in the anode chamber; and a cathode side element member disposed in the cathode chamber, having at least a cathode current collector and a pressing member configured to press the cathode current collector against the solid polymer electrolyte membrane side.

With this high-pressure water electrolysis apparatus according to the embodiment, an outer circumference edge portion of the anode side separator forming the anode chamber and facing the solid polymer electrolyte membrane, or an outer circumference edge portion of the water channel member facing the solid polymer electrolyte membrane has a smaller dimension at depth from the bottom of the anode chamber than the thickness of the anode side element member.

Further, the high-pressure water electrolysis apparatus according to the embodiment includes a high-pressure hydrogen communication hole configured to pass through the anode current collector, the solid polymer electrolyte membrane, and the cathode current collector and to discharge the high-pressure hydrogen generated by electrolyzation, a first seal member configured to be introduced between the outer circumference edge portion and the solid polymer electrolyte membrane, and a second seal member having the same thickness as the anode side element member, to be disposed in the anode chamber at the time of operation, configured to shield between the anode chamber and the high-pressure hydrogen communication hole.

Also, with this high-pressure water electrolysis apparatus according to the embodiment, the second seal member may be an O-ring; with the second seal member being in contact with a single member making up the anode side element member.

Further, with this high-pressure water electrolysis apparatus according to the embodiment, the anode side element member may include a sheet member where a plurality of openings are formed; with the water channel member including a recessed portion which houses the anode current collector and the sheet member, and also, the side portion of the water channel member being in contact with the second seal member.

Further, with this high-pressure water electrolysis apparatus according to the embodiment, the anode side separator may be a plate-like member; with the first seal member having the same thickness as with the anode side element member.

Moreover, with this high-pressure water electrolysis apparatus according to the embodiment, the anode current collector may include a frame portion at an outer circumference.

According to the embodiment, the first seal member seals between the outer circumference edge portion of the anode side separator or the outer circumference edge portion of the water channel member and the solid polymer electrolyte membrane. On the other hand, the second seal member is disposed in the anode chamber, and shields between the anode chamber and the high-pressure hydrogen communication hole. Thus, the number of members requiring smoothness on the anode side is reduced, and also, a recessed portion to house the anode side element member and a groove portion to dispose the second member are not individually provided to the anode side separator. Accordingly, processing precision dose not have to be set high, and a desired seal function may be secured with a simple and also economical configuration.

Obviously, numerous modifications and variations of the present invention are possible in light of the above teachings. It is therefore to be understood that within the scope of the appended claims, the invention may be practiced otherwise than as specifically described herein.

What is claimed is:

1. A high-pressure water electrolysis apparatus comprising:
    a solid polymer electrolyte membrane;
    an anode side separator disposed on a first face side of the solid polymer electrolyte membrane and including an outer circumference edge portion facing the solid polymer electrolyte membrane to define an anode chamber opened to the first face side;
    a cathode side separator disposed on a second face side of the solid polymer electrolyte membrane and including a cathode chamber opened to the second face side;
    an anode side element member comprising:
        an anode current collector; and
        a water channel member to distribute electrolytic water to the anode current collector, the water channel member being disposed in the anode chamber and including an outer circumference edge portion facing the solid polymer electrolyte membrane;
    a cathode side element member disposed in the cathode chamber and comprising:
        a cathode current collector; and
        a pressing member to press the cathode current collector against a side of the solid polymer electrolyte membrane;
    a high-pressure hydrogen communication hole which extends through the anode current collector, the solid polymer electrolyte membrane, and the cathode current collector and through which high-pressure hydrogen generated from the electrolytic water by electrolyzation is to be discharged;
    a first seal member provided between the solid polymer electrolyte membrane and the outer circumference edge portion of the anode side separator, one of the outer circumference edge portion of the anode side separator and the outer circumference edge portion of the water channel member having a smaller dimension at depth from a bottom of the anode chamber than a thickness of the anode side element member; and
    a second seal member having a thickness same as the thickness of the anode side element member at a time of operation of the high-pressure water electrolysis apparatus, the second seal member being disposed in the anode chamber to shield between the anode chamber and the high-pressure hydrogen communication hole.

2. The high-pressure water electrolysis apparatus according to claim 1,
    wherein the second seal member comprises an O-ring, and
    wherein the second seal member is in contact with only one of the anode current collector and the water channel member constituting the anode side element member.

3. The high-pressure water electrolysis apparatus according to claim 2,
    wherein the anode side element member includes a sheet member having a plurality of openings,
    wherein the water channel member includes a recessed portion to house the anode current collector and the sheet member, and wherein a side portion of the water channel member is in contact with the second seal member.

4. The high-pressure water electrolysis apparatus according to claim 1,
wherein the anode side separator is a plate-like member, and
wherein the first seal member has a thickness same as the anode side element member.

5. The high-pressure water electrolysis apparatus according to claim 1, wherein the anode current collector includes a frame portion at an outer circumference of the anode current collector.

6. The high-pressure water electrolysis apparatus according to claim 1, wherein the second seal member is in contact with the water channel member of the anode side element member.

7. A high-pressure water electrolysis apparatus comprising:
a solid polymer electrolyte membrane;
an anode side separator disposed on a first face side of the solid polymer electrolyte membrane and having a flat plane shape;
a cathode side separator disposed on a second face side of the solid polymer electrolyte membrane;
an anode side element member disposed between the anode side separator and the solid polymer electrolyte membrane and comprising:
  an anode current collector; and
  a water channel member to distribute electrolytic water to the anode current collector;
a cathode side element member disposed between the cathode side separator and the solid polymer electrolyte membrane and comprising:
  a cathode current collector; and
  a pressing member to press the cathode current collector against a side of the solid polymer electrolyte membrane;
a high-pressure hydrogen communication hole which extends through the anode current collector, the solid polymer electrolyte membrane, and the cathode current collector and through which high-pressure hydrogen generated from the electrolytic water by electrolyzation is to be discharged;
a water supply communication hole provided on an outer periphery of the anode current collector and mutually communicating in a stacking direction to supply the electrolytic water;
a water discharge communication hole provided on an outer periphery of the anode current collector and mutually communicating in the stacking direction to discharge oxygen generated by the electrolyzation and unreacted electrolytic water;
first seal members provided to circle around each of the water supply communication hole and the water discharge communication hole; and
a second seal member having a thickness same as the thickness of the anode side element member at a time of operation of the high-pressure water electrolysis apparatus, the second seal member being disposed between the anode side separator and the solid polymer electrolyte membrane to circle around the high-pressure hydrogen communication hole.

* * * * *